United States Patent [19]

Seo et al.

[11] Patent Number: 5,511,738
[45] Date of Patent: Apr. 30, 1996

[54] IDLER CONTROLLING APPARATUS OF A MAGNETIC RECORDING/REPRODUCING APPARATUS

[75] Inventors: Jae K. Seo; Do Y. Choi; Gun C. Park, all of Suwon, Rep. of Korea

[73] Assignee: Samsung Electronics Co., Ltd., Kyungki-do, Rep. of Korea

[21] Appl. No.: 308,580

[22] Filed: Sep. 19, 1994

[30] Foreign Application Priority Data

Sep. 22, 1993 [KR] Rep. of Korea .................. 93-19111

[51] Int. Cl.$^6$ ................................................. G11B 15/26
[52] U.S. Cl. ................................................. 242/356
[58] Field of Search ................... 242/356, 356.3, 242/356.5, 356.7; 360/96.3, 96.4

[56] References Cited

U.S. PATENT DOCUMENTS 4,419,702  12/1983  Tanaka .............................. 360/96.4
4,422,114  12/1983  Sugihara .......................... 242/354.2
4,564,873   1/1986  Hashimoto et al. .............. 360/96.3
4,591,935   5/1986  Kouda .............................. 360/96.3

FOREIGN PATENT DOCUMENTS 0223952   6/1987  European Pat. Off. ........... 360/96.3
59-28266   2/1984  Japan ................................ 242/356
9321631  10/1993  WIPO .

Primary Examiner—John P. Darling
Attorney, Agent, or Firm—Sughrue, Mion, Zinn, Macpeak & Seas

[57] ABSTRACT

In a magnetic recording/reproducing apparatus, an idler gear is selectively moved between controlling a take up reel and a supply reel. An idler controlling apparatus limits the swing angle of the idler to a relatively small angle when the upper chassis is being seated on the lower chassis or when the tape is being ejected. The idler controlling apparatus also permits a wide swing angle of the idler when the tape recording/reproduction operations take place. The wide swing permits the idler gear to selectively control the take up and supply reels.

5 Claims, 4 Drawing Sheets

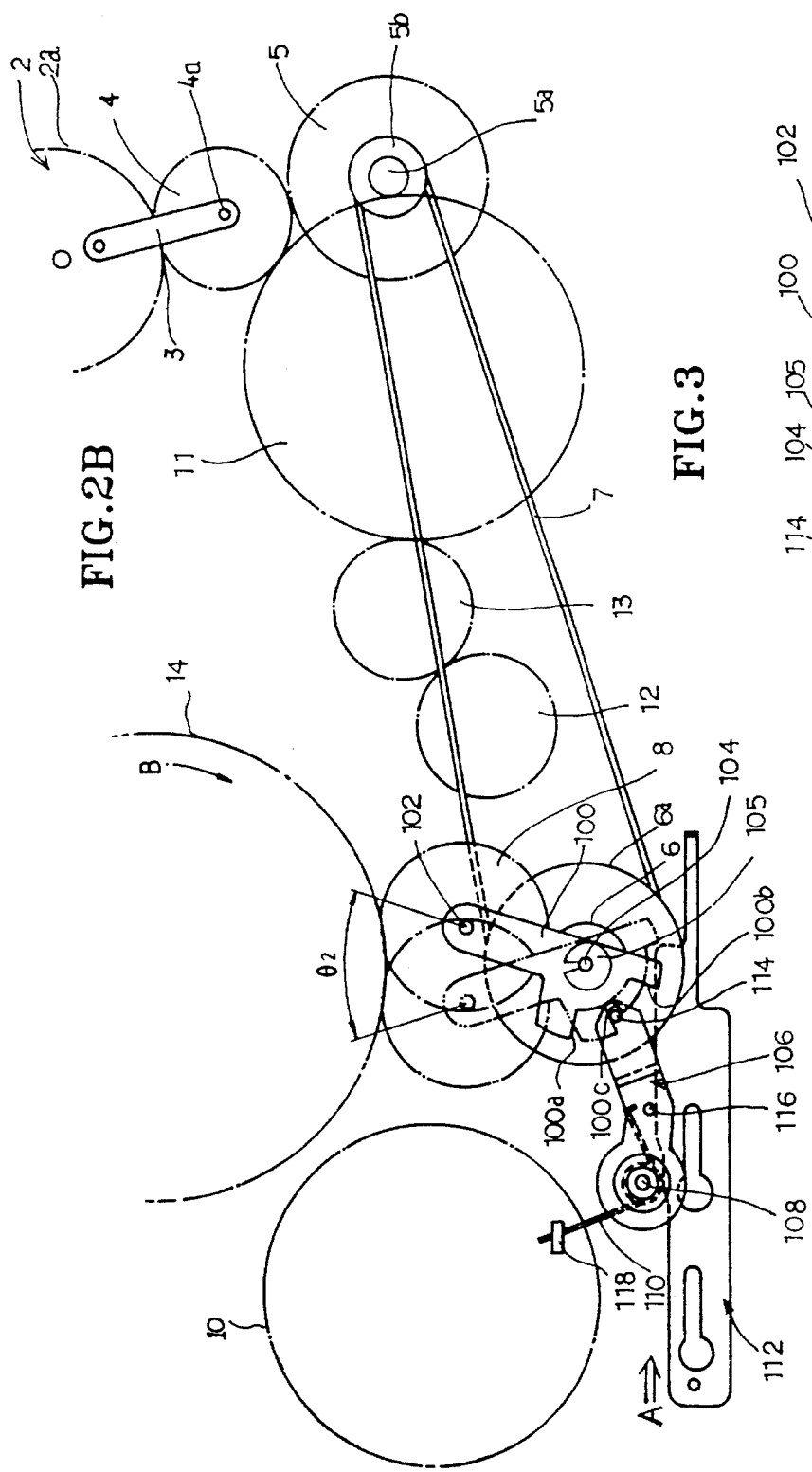

IDLER CONTROLLING APPARATUS OF A MAGNETIC RECORDING/REPRODUCING APPARATUS

BACKGROUND OF THE INVENTION

1. Field of the Invention

The present invention relates to a travelling system of a magnetic recording/reproducing apparatus, and more particularly to an idler controlling apparatus, wherein the rotational force transmitted to a travelling system from a capstan motor is selectively supplied to a supply reel and a take-up reel for controlling the travel of a magnetic tape.

2. Description of Prior Devices

Generally, magnetic recording/reproducing devices which record or reproduce signals on or from a magnetic tape, include a drum provided with heads on a deck, a tape travelling system for transferring the magnetic tape seated on a supply reel and a take-up reel along a predetermined path, a tape loading system for applying the magnetic tape to the drum, and elements for driving the reels. Typically, such a magnetic recording/reproducing device will have a loading motor for driving the tape loading system and a capstan motor for driving the tape travelling system and reels. The inclusion of two motors tends to make the magnetic recording/reproducing device relatively large and heavy.

A recent trend has been towards small lightweight magnetic recording/reproducing devices, such as those which utilize the widely available 8 mm tape cassette. Applicants of the present invention devised a small, lightweight magnetic recording/reproducing device as disclosed in Published PCT Application WO93/12163, (corresponding to Korean Patent Application 93-5016), which is incorporated herein by reference. As disclosed in the latter publication, the deck size is highly minimized in such a manner that a tape cassette is inserted into a cassette holder having a rotary drum to perform the first loading of a magnetic tape, and the cassette holder is then closed by being pressed to fully load the magnetic tape secondly, wherein the rotary drum is completely held within an internal space of the tape cassette while the loading operation of the tape cassette is completed. According to this apparatus, power is supplied to the travelling system and loading system by means of a single capstan motor, thereby eliminating the need for two motors and reducing the size and weight of the tape deck. The invention herein pertains to an improvement for the magnetic recording/reproducing player of the type described therein.

Applicants have also devised an idler controlling apparatus suitable for the latter mentioned small type magnetic recording/reproducing apparatus as disclosed in pending U.S. patent application Ser. No. 08/280,611 (corresponding to Korean Patent Application (KPA) No. 93-14174) now U.S. Pat. No. 5,467,234, incorporated by reference herein. As shown in FIG. 1, which represents the device of the latter Patent Application, a capstan motor 2, which rotates in the forward or reverse directions in accordance with a mode control signal, is mounted on one side of the lower chassis 1. A transmission gear 4, which rotates around a shaft 4a, is brought into meshing engagement with gears 2a of the capstan motor 2 by means of a lever 3 on a bracket (not illustrated), and swings to the right or left under the control of the capstan motor and a plunger (not shown). When swung to the right, the gear 4 meshes with the gear 5 of the tape travelling system. When swung to the left, the gear 4 is meshed with a gear (not shown) of the tape loading system. The tape loading system as well as the apparatus for controlling the selective transfer of rotary power from capstan motor 2 to the loading system and the tape travelling system is fully shown in the above mentioned Published PCT application, although certain of the details shown in the PCT application are not shown herein as they are not necessary for a complete understanding of the features added by the present invention.. The tape loading system includes a ring gear 14 plus a plurality of gears (not shown) that transfer rotary power from the gear 4 to the ring gear 14. The ring gear loads the tape onto the rotary drum in a well known manner.

The magnetic tape travelling system is formed such that gear 5 rotates around a shaft 5a on the lower chassis 1. The gear 5 is brought into meshing engagement with the transmission gear 4, which transmits the rotational force of the capstan motor 2. A pulley 5b formed on the gear 5 is connected to a pulley 6a of a driven gear 6 via a belt 7. The driven gear 6 is brought into meshing engagement with an idler gear 8 connected through the upper portion of an idler lever 8a, so that the idler gear 8 swings to the right or to the left in accordance with the rotational direction of the capstan motor 2 to supply the rotational force to a take up reel 11 and a supply reel 10, both of which are installed on an upper chassis (not illustrated). The take-up reel is indirectly supplied with the rotational force via auxiliary gears 12 and 13.

A cam gear 15 rotating around a shaft 15a is installed to be brought into meshing engagement with the ring gear 14. A cam groove 15b is formed in the upper plane of the cam gear 15, and a cam follower pin 16b of lever 16 follows the cam groove as cam gear 15 rotates, thereby causing lever 16 to pivot to the right and left about shaft 16a. A pin 16c at the lower end of the cam lever 16 fits into the end of an eject lever 17, which is installed to move in the horizontal direction.

A projecting part 17a is formed on the eject lever 17 and fits into a groove 18a formed in an idler cam 18. The idler cam 18 is formed of a thin plate and is provided with a cam surface 18b. A follower pin 8b of the idler lever 8a is in contact with the cam surface 18b. The cam 18 is biased to the position illustrated by a spring 20 attached at one end to a pin 19 and at the other end to a hooking plate not shown.

In the latter travelling system, the cam gear 15 is rotated when the ring gear 14 is rotated. As a result, the cam lever 16 and eject lever 17 are moved right to left to make the idler lever 8a and the idler gear swing to the right or to the left so that the idler gear 8 is coupled to the supply reel 10 or auxiliary gears 12 and 13 in accordance with the rotational direction of the capstan motor 2. Details of this operation are found in the latter mentioned Published PCT application.

The idler controlling apparatus places the idler gear 8 and idler lever 8a in a central position when the upper chassis is being seated on the lower chassis, and swings the idler to the right or the left during the travelling of the tape between the supply and take up reels. The direction of the swing and the reel which is controlled is dependent upon the rotational direction of the capstan motor.

Because of the potential for movement of the idler lever and idler gear, if the idler lever and gear are free to move during the process of seating the upper chassis on the lower chassis, the freely moving gear may interfere with the seating process. Therefore it is necessary to limit such movement during the seating process.

SUMMARY OF THE INVENTION

The present invention is an improvement of the above described idler controlling apparatus. It is an object of the invention to provide an improved idler controlling apparatus which guides an idler to swing within a predetermined range limit, thereby inhibiting the idler from contacting components of an upper chassis when the upper chassis is seated on the lower chassis.

To achieve the above object of the present invention, there is provided an idler controlling apparatus of a magnetic recording/reproducing apparatus which has a driven gear that is driven in the forward or reverse directions by a driving source installed on a lower chassis, and an idler gear selectively brought into meshing engagement with a supply reel and a take-up reel provided on an upper chassis during the forward and reverse rotation of the driven gear for rotating the supply reel and take-up reel. The idler controlling apparatus also includes an idler controlling unit that is controlled by rotation of a ring gear that is operated by the driving source. The idler controlling unit guides the idler to prevent it from contacting the supply reel and the take-up reel when the upper chassis is seated on the lower chassis, and guides the idler to contact either the supply reel or the take-up reel when the magnetic tape travels after seating the upper chassis on the lower chassis, so that the supply reel and take-up reel are selectively rotated.

Preferably, the idler controlling unit includes an eject lever horizontally moved by being interlocked with the ring gear which rotates during the seating of the upper chassis; and an idler cam contacting one end of the idler lever for elastically swinging around a predetermined shaft during the horizontal movement of the eject lever to guide the idler so that it will not contact the supply reel and take-up reel, and regulating the swings of the idler in both directions.

BRIEF DESCRIPTION OF THE DRAWINGS

The above objects and other advantages of the present invention will become more apparent from the following description of a preferred embodiment thereof with reference to the attached drawings in which:

FIG. 2B is a plan view showing the position of the idler when the unloading operation is stopped to eject a tape;

FIG. 3 is a sectional view showing the idler of the idler controlling apparatus according to the present invention, taken along line III—III of FIG. 2.

DETAILED DESCRIPTION OF THE PREFERRED EMBODIMENT

Figure 1:
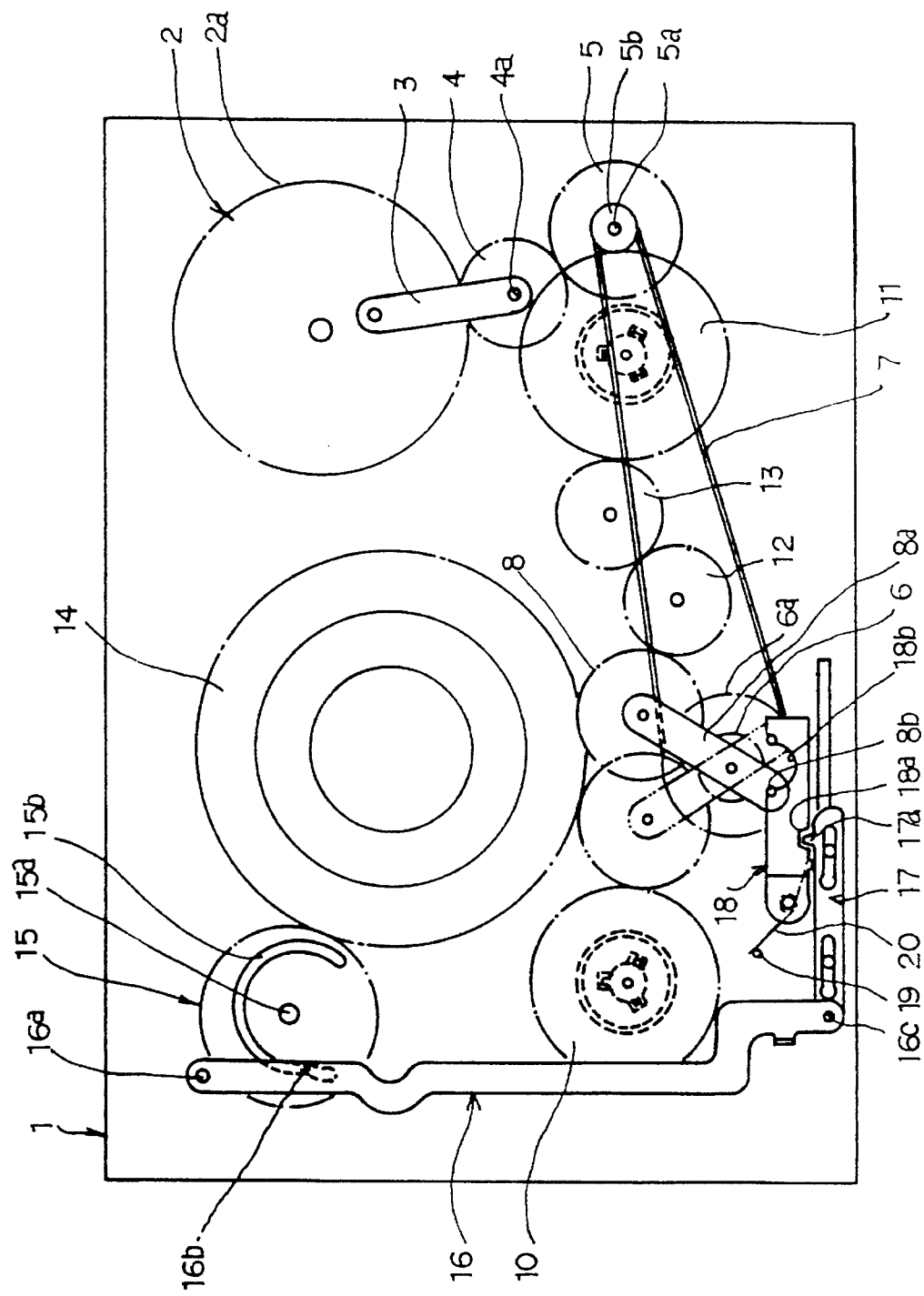
FIG. 1 is a plan view showing a travelling system of a magnetic recording/reproducing apparatus provided with an idler controlling apparatus.
Figure 2A:
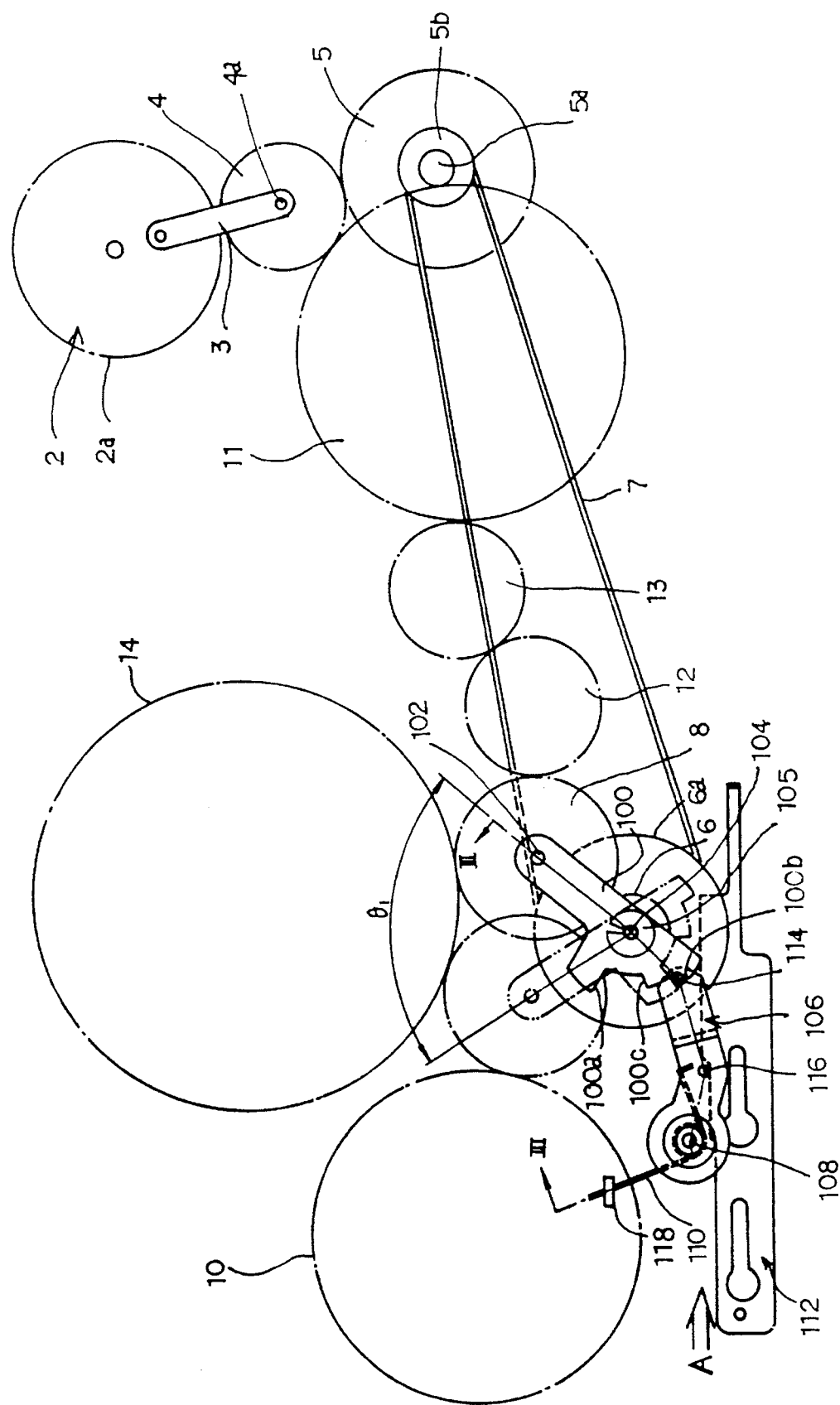
FIG. 2A is a plan view of an idler controlling apparatus according to the present invention.

In FIGS. 2A and 2B, illustrating the travelling system of a magnetic tape recorder/reproducer provided with an idler controlling apparatus according to the present invention, reference numerals common to FIG. 1 and to FIGS. 2A and 2B designate the identical parts. Therefore, elements already described in FIG. 1 will not be described further in detail, except to the extent necessary for a full understanding of the invention.

Referring to FIGS. 2A and 2B, an idler gear 8 is installed to be rotatable around a shaft 102 on one end of an idler lever 100. At the other end of the idler lever 100, there is provided a first swing angle regulation portion for regulating a swing angle $\theta_1$ of the idler gear 8 during reproduction, stop, fast forward (FF) and rewind (REW) of a tape, and a second swing angle regulation portion for regulating a swing angle $\theta_2$ of the idler gear 8 during ejection of the tape. The first swing angle regulation portion is formed of a first end jaw 100a and a second end jaw 100b. The second swing angle regulation portion is formed of the first end jaw 100a and a third end jaw 100c. The idler lever 100 rotates around a shaft 104 within the range of the swing angle $\theta_1$ or $\theta_2$ under control of an idler cam, which will be described later.

As illustrated in detail in FIG. 3, a pulley 6a is mounted on the lower side of a driven gear 6, and the driven gear 6 and the pulley 6a are rotated around the shaft 104 fixed to a lower chassis 1.

A setting ring 105 is installed on the end of the shaft 104 to hold the driven gear 6 and the pulley 6a on the shaft 104. The idler gear 8 is fixed at the end of the idler lever 100 to be rotatable around the shaft 102 and to be in meshing engagement with the driven gear 6.

An idler cam 106 is installed to pivot around a shaft 108, which is fixed to the lower chassis 1. A spring 110 biases the idler cam 106 towards the clockwise direction as seen from above in FIGS. 2A and 2B. Two pins 114 and 116 are provided on the end and center of the idler cam 106.

One end of the spring 110 is hooked onto a hooking plate 118 installed on the lower chassis 1, and other end thereof is hooked onto the idler cam 106. The spring 110 forces the pin 116 of idler cam 106 against one side of an eject lever 112.

The side of the eject lever 112 that is in contact with the pin 116 is stepped for the purpose of allowing the end of the idler cam 106 to swing upward and downward around the shaft 108 when the eject lever 112 is horizontally moved to the right and to the left.

Figure 4:
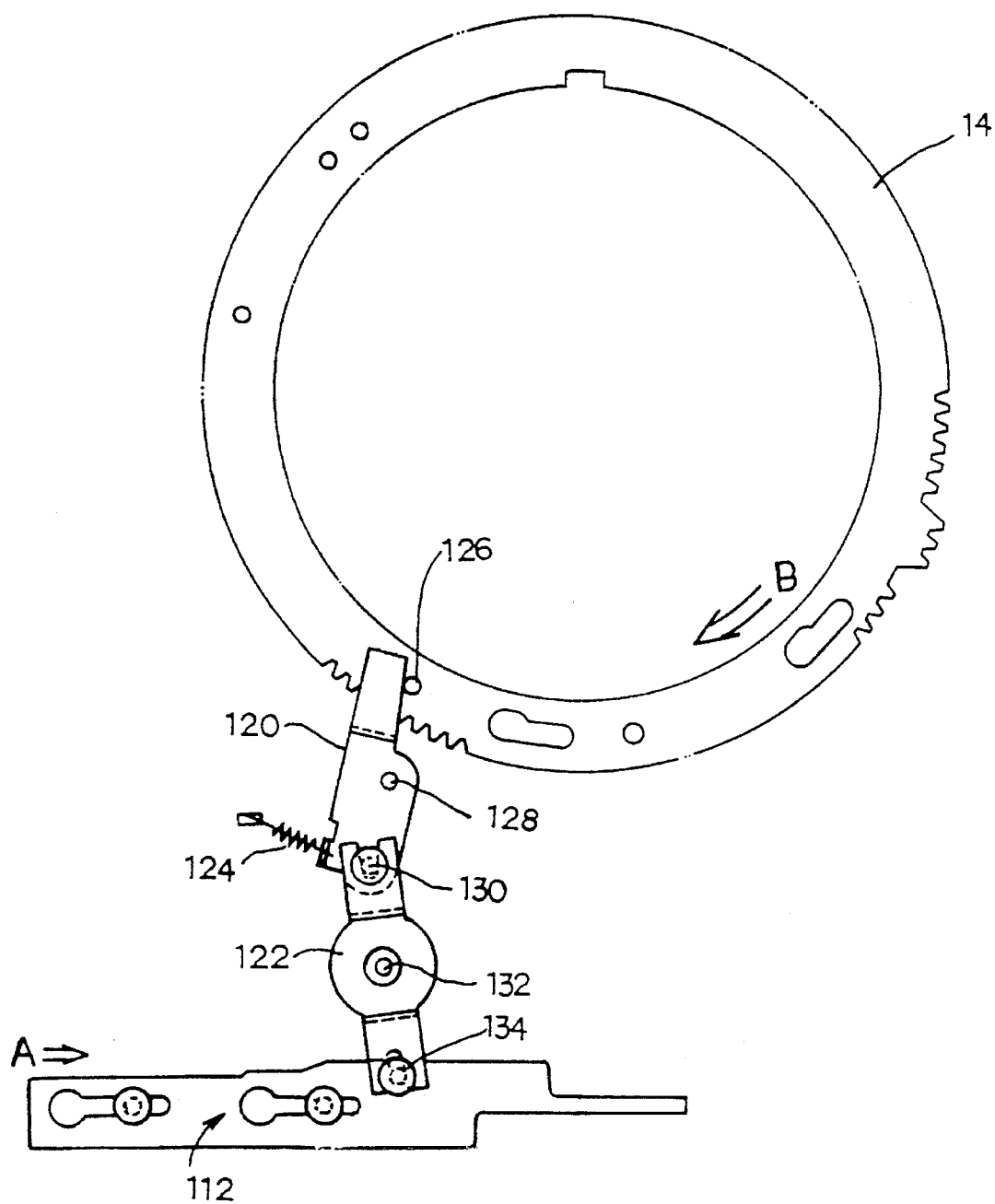
FIG. 4 is a plan view showing the operation lever for operating the eject lever.

As shown in FIG. 4, the eject lever 112 is controlled to move to the right or the left by an interlocking operation of a pair of links 120 and 122 and a spring 124 during the rotation of the ring gear 14. The eject lever 112 is moved in the direction of an arrow A whenever the tape is running; i.e., during any modes corresponding to reproduction, rewinding, fast forward or stop. The eject lever 112 is moved in a direction opposite to the direction A during the ejection of the tape. The link 120 rotates around a shaft 128, and the link 122 rotates around a shaft 132. The links are hinged together by hinge connection 130. Link 122 is hinge connected to eject lever 112. A spring 124 biases link 120 in the clockwise direction, as seen from above in FIG. 4. As will be understood by anyone of ordinary skill in the art, the ring gear 14 is operated whenever the tape is loaded or unloaded onto the drum. Thus, an ejection operation includes an unloading operation as described herein. When the recording/reproducing apparatus is operating in any tape running mode, the ring gear 14 is stationary, the eject lever 112 is in its right most position as shown in FIG. 2A, and the idler rotation angle $\theta_1$ is controlled by the end jaws 100a and 100b of the idler lever 100. On the other hand, when the tape eject operation takes place, the rotation of the ring gear 14 moves eject lever 112 to the left to the position shown in FIG. 2B. In this case the swing angle $\theta_2$ is limited by the end jaws 100a and 100c of the idler 100.

From the shape of the jaws 100a, 100b, and 100c, it can be seen that the position of pin 114 on the end of idler cam 106 will either be in the path of jaw 100c or will not be in the path of 100c, depending upon the position of pin 114. Thus, when the idler cam 106 is pivoted counter clockwise, as in FIG. 2A, the pin 114 will be out of the path of jaw 100c.

Thus, at this time the idler 8 is free to rotate to one extreme position where pin 114 abuts jaw 100*a* and the opposite extreme position, where pin 114 abuts jaw 100*b*. However, if idler cam 106 is pivoted counterclockwise, as shown in FIG. 2B, the pin 114 is now in the path of rotation of jaw 100*c*. In this case the idler 8 can rotate to one extreme position, where the pin 114 abuts jaw 100*a*, and to the opposite extreme position, where the pin 114 abuts jaw 100*c*. Thus in the latter case, due to the abutment of pin 114 with jaw 100*c*, the swing angle of the idler is greatly reduced. Also, it can be seen that since the pin 114 is in different positions in FIGS. 2A and 2B, the angular position of the idler at the time of abutment with end jaw 100*a* will differ in each case. Specifically, comparing FIG. 2A with that of FIG. 2B, the pin in FIG. 2A is lower (as seen from above) and radially more distant from the center of idler shaft 104 than in FIG. 2B. Consequently, the idler in FIG. 2A rotates significantly more in the counterclockwise direction that it would in FIG. 2B before the end jaw 100*a* abuts and is stopped by pin 114. Thus, even though the same end jaw provides a stop of the counterclockwise rotation of the idler in both FIGS. 2A and 2B, the point at which the stop occurs differs in each case.

FIG. 2A shows the state of the eject lever 112 and the idler cam 106 when the tape is running. FIG. 2B shows the state of those elements when the tape cassette is being ejected. If ejection of a tape cassette is to be carried out and the system is in the state shown in FIG. 2A, the system is changed to the state of FIG. 2B by operation of the ring gear. Alternatively, if the eject lever 112 and the idler cam 106 are in the position of FIG. 2B and the tape is being loaded onto the drum, the ring gear will rotate in the opposite direction and move the idler cam 106 and eject lever 112 to the position shown in FIG. 2A, so that normal tape running operations can take place. The ring gear 14 rotates in the direction of an arrow B by a loading/unloading system. When the ring gear 14 rotates in the direction of the arrow B, the pin 126 on the ring gear 14 pushes one end of the link 120, swinging the link 120 counter-clockwise around the shaft 128. Upon the counter-clockwise swing of the link 120, the hinge 130 fixed to the link 120 pushes link 122 into a clockwise rotation around the shaft 132 to move the eject lever 112 fixed to the hinge 134 in the opposite direction of the arrow A.

While the eject lever 112 is moved to the left (i.e., from the position in FIG. 2A to the position in FIG. 2B), the pin 116 of the idler cam 106 is pushed up by the stepped portion of eject lever 112. This in turn causes the idler cam 106 to pivot counter clockwise about shaft 108 to the position shown in FIG. 2B. As a result, the idler lever 100 can swing only within the range of the swing angle θ₂ and therefore the idler gear 8 cannot engage the supply reel 10 or the auxiliary gear 12.

During a tape running operation, such as reproduction, rewind, fast forward, etc. the idler elements are in the state shown in FIG. 2A, and the idler gear 8 can swing within the angle θ₂ to selectively engage the supply reel gear 10 or the auxiliary gear 12 (for controlling the take up reel). Which of these gears is engaged is controlled by the direction of rotation of the capstan motor, as described above with reference to FIG. 1. However, the mechanism of the present invention places the idler elements in the condition of FIG. 2A when the tape cassette is loaded onto the rotary drum, so that a tape running operation can then take place.

Prior to loading, the idler elements will be as shown in FIG. 2B. The tape loading operation, as is will known, rotates ring gear 14 counter-clockwise, i.e., in the direction opposite to the arrow B. This operation causes the two links 120 and 122 to move eject lever 112 in the direction of arrow A. When eject lever 112 moves in the direction of arrow A, the pin 116 on idler cam 106 follows the stepped edge of the eject lever 112, allowing idler cam 106 to rotate clockwise under the force of the spring 110. The elements thereby assume the position as shown in FIG. 2A, permitting a tape running operation to take place.

Accordingly, the idler gear 8 is operated by being supplied with a driving force from the capstan motor 2 during the reproduction, stop, FF or REW of the tape to rotate the supply reel 10 or take-up reel 11 via the auxiliary gears 12 and 13. In this case, the idler cam 106 swings around the shaft 108 within the range of the swing angle θ₁ during the reproduction, FF or REW. The idler gear 8 is directly brought into meshing engagement with the supply reel 10, or the auxiliary gear 12 to supply the driving force to the take-up reel 11 via the auxiliary gear 13.

According to the idler controlling apparatus of the magnetic recording/reproducing apparatus as described above, an idler has its swing angle limited to prevent overlapping the components of a lower chassis when an upper chassis is seated on the lower chassis, while the right to left swing position of the idler is accurately regulated when the tape travels.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. In a magnetic recording/reproducing apparatus of the type having a drum, an upper chassis and a lower chassis;

said upper chassis having thereon a supply reel and a take up reel for supplying and taking up a travelling tape;

said lower chassis having thereon a driving source and an idler mechanism for providing the power of said driving source selectively to said supply and take up reels; said idler mechanism being positioned on said lower chassis to swing through a swing angle $\theta_1$ where it meshes with said supply reel when at one extreme of said swing and meshes with said take up reel when at the other extreme of said swing;

and a ring gear operative during loading and unloading of said tape onto and off of said drum; the improvement comprising:

idler controlling apparatus responsive to said ring gear for selectively permitting said idler mechanism to swing through said angle $\theta_1$ and limiting said idler mechanism to a swing through an angle $\theta_2$, where $\theta_2$ is wholly within $\theta_1$ and wherein the extremes of the swing through angle $\theta_2$ do not permit said idler mechanism to mesh with either said supply reel or said take up reel.

2. The mechanism of claim 1, wherein means connected between said ring gear and said idler controlling apparatus moves said idler mechanism to a first state, where said swing angle of said idler mechanism is $\theta_1$, when said ring gear is rotated to load said tape on said drum, and moves said idler mechanism to a second state, where said swing angle of said idler mechanism is $\theta_2$, when said ring gear is rotated to unload said tape from said drum.

3. The mechanism of claim 1, wherein said idler mechanism is in a state where it swings through an angle $\theta_1$ when tape running operations are performed, and in a state where it swings only through an angle $\theta_2$ when said tape is being ejected.

4. The mechanism of claims 1, 2 or 3 wherein said idler mechanism includes an idler which pivots about a pivot point and an idler gear attached to said idler at one end thereof, and wherein said idler controlling apparatus comprises:

- an eject lever moveable horizontally in response to rotation of said ring gear to a first horizontal position when said ring gear rotates to load said tape and to a second horizontal position when said ring gear rotates to unload said tape;
- an idler cam pivotally responsive to the horizontal position of said eject lever to pivot to a first position when said eject lever is in its first position and to a second position when said eject lever is in its second position; a pin connected to said idler cam to pivot with said idler cam; and
- a camming surface on said idler in contact with said pin on said idler cam; said camming surface being shaped to provide stops to the swing of said idler through its swing angle, whereby said stops permit said idler to swing through said angle $\theta_1$ when said eject lever and said idler cam are in said respective first positions, and whereby said stops limit said idler to swing through said angle $\theta_2$ when said eject lever and said idler cam are in said respective second positions.

5. The mechanism of claim 4 wherein said camming surface of said idler is shaped to form first, second and third end jaws protruding from said pivot point of said idler, with said first end jaw abutting said pin when said idler swings to its extreme position in one of said clockwise and counterclockwise direction, and with either said second or third end jaws abutting said pin when said idler swings to its extreme position in the opposite of said latter direction; said second end jaw extending radially outward from said pivot point further than said third end jaw whereby said second end jaw provides said stop when said idler cam is in said first position and said third end jaw provides said stop when said idler cam is in said second position.

* * * * *